(12) United States Patent
Eggert-Crowe et al.

(10) Patent No.: US 11,731,681 B2
(45) Date of Patent: *Aug. 22, 2023

(54) CHILD STROLLER APPARATUS

(71) Applicant: Wonderland Switzerland AG, Steinhausen (CH)

(72) Inventors: Colin F. Eggert-Crowe, King of Prussia, PA (US); Robert E. Haut, Merion Station, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 197 days.

This patent is subject to a terminal disclaimer.

(21) Appl. No.: 17/123,053

(22) Filed: Dec. 15, 2020

(65) Prior Publication Data

US 2021/0101633 A1 Apr. 8, 2021

Related U.S. Application Data

(63) Continuation of application No. 16/403,257, filed on May 3, 2019, now Pat. No. 10,899,377.

(Continued)

(51) Int. Cl.
*B62B 7/00* (2006.01)
*B62B 7/14* (2006.01)
(Continued)

(52) U.S. Cl.
CPC .............. *B62B 7/14* (2013.01); *B62B 9/28* (2013.01); *B62B 9/20* (2013.01)

(58) Field of Classification Search
CPC .............. B62B 7/14; B62B 9/28; B62B 9/20
See application file for complete search history.

(56) References Cited

U.S. PATENT DOCUMENTS 6,209,892 B1 4/2001 Schaaf et al.
9,108,659 B2 * 8/2015 Sparling ............... B62B 7/142
(Continued)

FOREIGN PATENT DOCUMENTS

AT 7611 U1 6/2005
CN 202180842 U 4/2012
(Continued)

OTHER PUBLICATIONS

Search report of the corresponding EP Patent Application No. 20202828.8 dated Feb. 4, 2021.
(Continued)

*Primary Examiner* — Hau V Phan
(74) *Attorney, Agent, or Firm* — Fay Kaplun & Marcin, LLP (57) ABSTRACT

A child stroller apparatus includes a standing frame, a push handle frame having a side segment, the side segment being pivotally connected with the standing frame via a pivot connection, an adapter having a coupling portion configured to receive the installation of a detachable part, the adapter being fixedly connected with a handle, the handle having a cavity through which is slidably disposed the side segment so that the handle and the adapter are slidable in unison along the side segment for adjustment, and a locking mechanism for locking the adapter in position on the side segment, the locking mechanism including a release actuator exposed on the handle for operation, the release actuator being operable to cause the locking mechanism to unlock for sliding adjustment of the handle and the adapter along the side segment.

16 Claims, 10 Drawing Sheets

Related U.S. Application Data (60) Provisional application No. 62/792,577, filed on Jan. 15, 2019, provisional application No. 62/666,326, filed on May 3, 2018.

(51) Int. Cl.
  *B62B 9/28* (2006.01)
  *B62B 9/20* (2006.01)

(56) References Cited

U.S. PATENT DOCUMENTS

| | | | | |
|---|---|---|---|---|
| 9,399,477 | B2* | 7/2016 | Iftinca | B62B 9/104 |
| 9,517,789 | B2* | 12/2016 | Pacella | B62B 9/28 |
| 9,545,941 | B2* | 1/2017 | Pacella | B62B 7/145 |
| 9,725,106 | B2* | 8/2017 | Pos | B62B 9/102 |
| 9,884,640 | B2* | 2/2018 | Li | B62B 7/08 |
| 10,023,218 | B2* | 7/2018 | Paxton | B62B 7/008 |
| 10,899,377 | B2* | 1/2021 | Eggert-Crowe | B62B 9/28 |
| 2010/0244408 | A1* | 9/2010 | Dean | B62B 7/142 |
| | | | | 403/103 |
| 2010/0259021 | A1* | 10/2010 | Ahnert | B62B 9/20 |
| | | | | 280/47.38 |
| 2013/0087993 | A1* | 4/2013 | Jacquet | B62B 7/12 |
| | | | | 280/647 |
| 2017/0313339 | A1* | 11/2017 | Ruggiero | B62B 7/105 |
| 2017/0334476 | A1* | 11/2017 | Paxton | A47D 13/025 |

FOREIGN PATENT DOCUMENTS

| | | |
|---|---|---|
| CN | 203528545 U | 4/2014 |
| CN | 103979005 A | 8/2014 |
| CN | 203996380 U | 12/2014 |
| CN | 105383537 A | 3/2016 |
| CN | 205168610 U | 4/2016 |
| CN | 105644604 A | 6/2016 |
| CN | 202180842 U | 4/2018 |
| DE | 9212161 | 1/1993 |
| GB | 2535 428 A | 8/2016 |

OTHER PUBLICATIONS

Office Action of the corresponding Chinese Patent Application No. 201910368473.X (with English translation) dated May 11, 2021.

* cited by examiner

_CHILD STROLLER APPARATUS_

CROSS-REFERENCE TO RELATED APPLICATION(S)

This application is a continuation of U.S. patent application Ser. No. 16/403,257 filed on May 3, 2019, which respectively claims priority to U.S. provisional application No. 62/666,326 filed on May 3, 2018, and to U.S. provisional application No. 62/792,577 filed on Jan. 15, 2019, the disclosures of which are incorporated herein by reference.

BACKGROUND

1. Field of the Invention

The present invention relates to child stroller apparatuses.

2. Description of the Related Art

Caregivers usually rely on a stroller apparatus to transport babies and children. A stroller apparatus is typically constructed from a metal frame that comprises an assembly of metal and plastic parts, and a fabric element that connects or wraps around the metal frame. When it is unused, the stroller apparatus can be collapsed for convenient storage or transport.

Some existing stroller apparatus may be configurable to include one or multiple seats so as to be able to transport one or more children at a time. However, a stroller apparatus accommodating multiple seats can have a very large frame structure, which can be difficult to maneuver, store and transport. Moreover, the seats are usually installed at fixed positions that are far from the caregiver, which does not facilitate interaction between the child and the caregiver.

Therefore, there is a need for a child stroller apparatus that can be convenient to operate, and address at least the foregoing issues.

SUMMARY

The present application describes a child stroller apparatus that is convenient to operate, and has a mount system configurable to accommodate various detachable parts, such as one or two detachable child seats.

According to one aspect, the child stroller apparatus includes a standing frame, a push handle frame having a side segment, the side segment being pivotally connected with the standing frame via a pivot connection, an adapter having a coupling portion configured to receive the installation of a detachable part, the adapter being fixedly connected with a handle, the handle having a cavity through which is slidably disposed the side segment so that the handle and the adapter are slidable in unison along the side segment for adjustment, and a locking mechanism for locking the adapter in position on the side segment, the locking mechanism including a release actuator exposed on the handle for operation, the release actuator being operable to cause the locking mechanism to unlock for sliding adjustment of the handle and the adapter along the side segment.

DETAILED DESCRIPTION OF THE EMBODIMENTS

Figure 1:
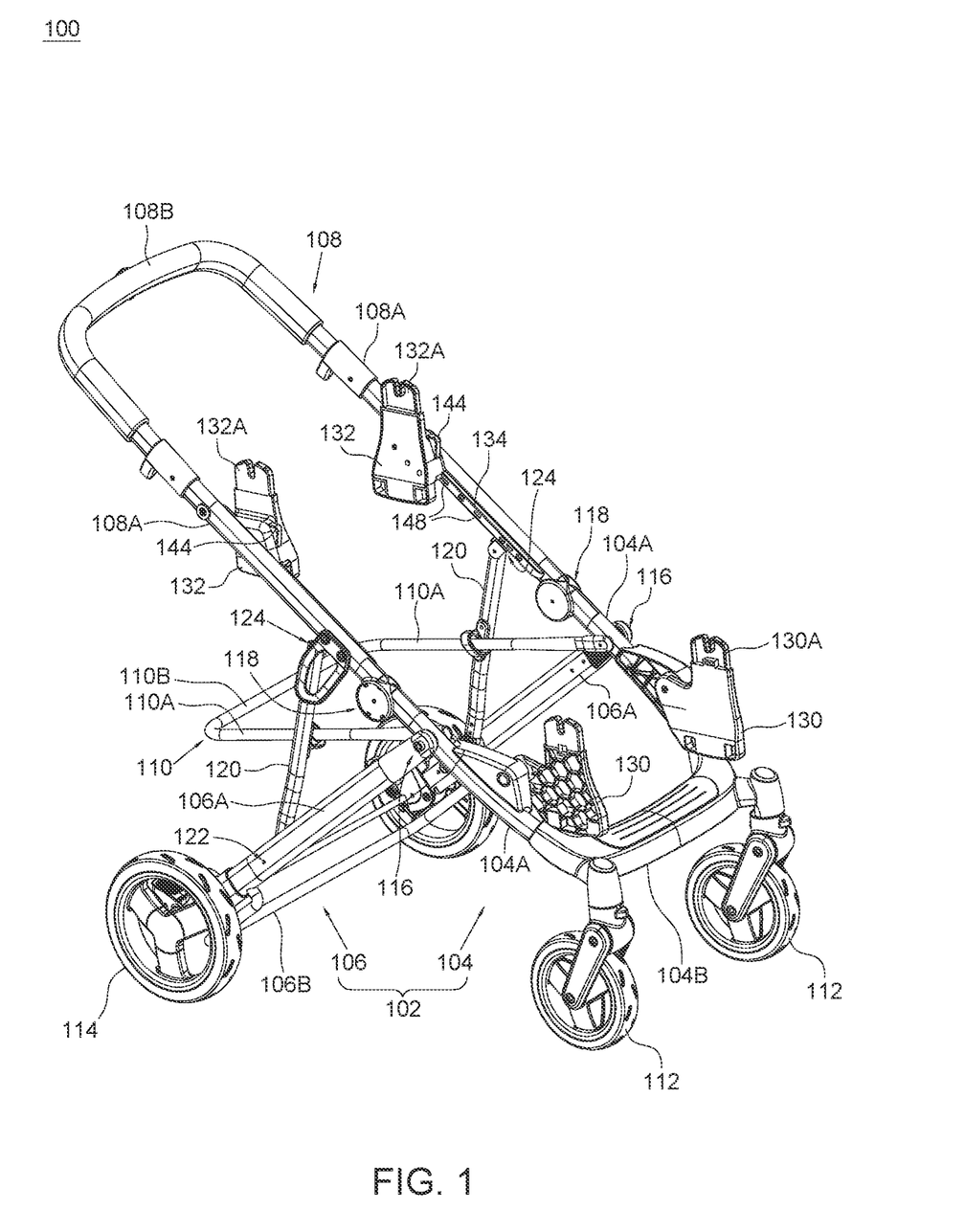
FIG. 1 is a perspective view illustrating an embodiment of a child stroller apparatus.

FIG. 1 is a perspective view illustrating an embodiment of a child stroller apparatus 100. Referring to FIG. 1, the child stroller apparatus 100 can include a standing frame 102 comprised of a front leg frame 104 and a rear leg frame 106, a push handle frame 108 connected with the standing frame 102, and a rear support frame 110. According to an example of construction, the front leg frame 104, the rear leg frame 106, the push handle frame 108 and the rear support frame 110 may be formed by tubular structures.

The front leg frame 104 can include two side segments 104A respectively disposed at a left and a right side of the child stroller apparatus 100, and a transversal portion 104B connected with the two side segments 104A. A lower portion of the front leg frame 104 can provided with a plurality of wheel assemblies 112.

The rear leg frame 106 can include two side segments 106A respectively disposed at a left and a right side of the child stroller apparatus 100, and a transversal segment 106B connected with the two side segments 106A. A lower portion of the rear leg frame 106 can provided with a plurality of wheel assemblies 114.

The push handle frame 108 can include two side segments 108A respectively disposed at a left and a right side of the child stroller apparatus 100, and a transversal portion 108B connected with the two side segments 108A.

At each of the left and right side of the child stroller apparatus 100, a same assembly structure is applied for connecting the front leg frame 104 and the rear leg frame 106 of the standing frame 102, and the push handle frame 108. More specifically, an upper end of the side segment 106A of the rear leg frame 106 is pivotally connected with the corresponding side segment 104A of the front leg frame 104 via a pivot connection 116, whereby the front leg frame 104 and the rear leg frame 106 of the standing frame 102 are rotatable relative to each other about the pivot connections 116. Each pivot connection 116 can include, e.g., a pivot shaft assembled through the side segments 104A and/or 106A. The side segment 108A of the push handle frame 108 can be pivotally connected with the standing frame 102 via a pivot connection 118 so that the push handle frame 108 is rotatable relative to the standing frame 102. For example, the side segment 108A of the push handle frame 108 can be pivotally connected with the corresponding side segment 104A of the front leg frame 104 via the pivot connection 118, whereby the front leg frame 104 and the push handle frame 108 are rotatable relative to each other about the pivot connections 118. Moreover, each of the left and right side of the child stroller apparatus 100 respectively includes a linking bar 120, which is respectively connected pivotally with the side segment 106A of the rear leg frame 106 and the side segment 108A of the push handle frame 108 via two pivot connections 122 and 124. In this manner, the rear leg frame 106 and the push handle frame 108 can be movably coupled to each other for facilitating folding and unfolding of the child stroller apparatus 100.

Referring to FIG. 1, the rear support frame 110 may have a generally U-shape including two side segments 110A respectively connected with the two side segments 104A of the front leg frame 104 and the two linking bars 120, and a transversal segment 110B connected with the two side segments 110A. More specifically, the two linking bars 120 may exemplary have two slidable mounts, and the two side segments 110A of the rear support frame 110 may be respectively mounted on the two slidable mounts on the two linking bars 120. The rear support frame 110, including the two side segments 110A and the transversal segment 110B, may be formed as a unitary part.

When the child stroller apparatus 100 is unfolded for use, the pivot connections 118 coupling the front leg frame 104 to the push handle frame 108 are located above the pivot connections 116 coupling the front leg frame 104 to the rear leg frame 106, and the side segments 104A of the front leg frame 104 can extend generally along a same direction as the side segments 108A of the push handle frame 108. For folding the child stroller apparatus 100, the push handle frame 108 can be rotated toward the front leg frame 104, which can fold the front leg frame 104 and the rear leg frame 106 close to each other.

Referring to FIG. 1, the child stroller apparatus 100 can further include a mount system comprised of a plurality of adapters 130 and 132 for installation of one or two detachable parts as desired. More specifically, two adapters 130 may be respectively provided on the two side segments 104A of the front leg frame 104 adjacently above the transversal portion 104B, and two adapters 132 may be respectively provided on the two side segments 108A of the push handle frame 108. Examples of detachable parts that may be installed on the adapters 130 and 132 can include, without limitation, detachable child seats such as child stroller seats and child safety seats, bassinets, storage components such as baskets, and the like.

The two adapters 130 can be similar in construction, and are configured to receive the installation of a detachable part at a lower front position on the child stroller apparatus 100. According to an example of construction, the two adapters 130 may be respectively connected pivotally with the two side segments 104A of the front leg frame 104. Each of the two adapters 130 is thereby rotatable relative to the front leg frame 104 between a use position (as shown in FIG. 1) where a coupling portion 130A of the adapter 130 protrudes upward for engagement with a detachable part, and an unused position (not shown) where the coupling portion 130A is oriented downward for disabling engagement of a detachable part. The coupling portion 130A may have a symmetric shape so as to be able to receive the engagement of a detachable part in different orientations. For example, a detachable child seat may be engaged with the coupling portion 130A in a rearward facing position or a forward facing position as desired.

Referring to FIG. 1, the two adapters 132 can be similar in construction, and respectively have coupling portions 132A configured to receive the installation of a detachable part at a higher rear position on the child stroller apparatus 100. The coupling portion 132A may have a symmetric shape so as to be able to receive the engagement of a detachable part in different orientations. For example, a detachable child seat may be engaged with the coupling portion 132A in a rearward facing position or a forward facing position as desired. The two adapters 132 are respectively connected slidably with the two side segments 108A of the push handle frame 108, whereby each adapter 132 can slide upward and downward along the side segment 108. According to an example of construction, each side segment 108A can be fixedly connected with a rail 134 that extends along the side segment 108A between the pivot connection 118 and the transversal portion 108B, and the corresponding adapter 132 can be slidably connected with the rail 134. The two adapters 132 can thereby slide along the two side segments 108A between the transversal portion 108B and the two pivot connections 118 with the coupling portions 132A of the adapters 132 protruding upward. The sliding axis of each adapter 132 can be supported by each side segment 108A and can be generally parallel to the side segment 108A. Accordingly, a detachable part mounted on the two adapters 132 can slide in unison with the adapters 132 along the side segments 108A of the push handle frame 108 for adjustment between multiple positions.

Figure 2:
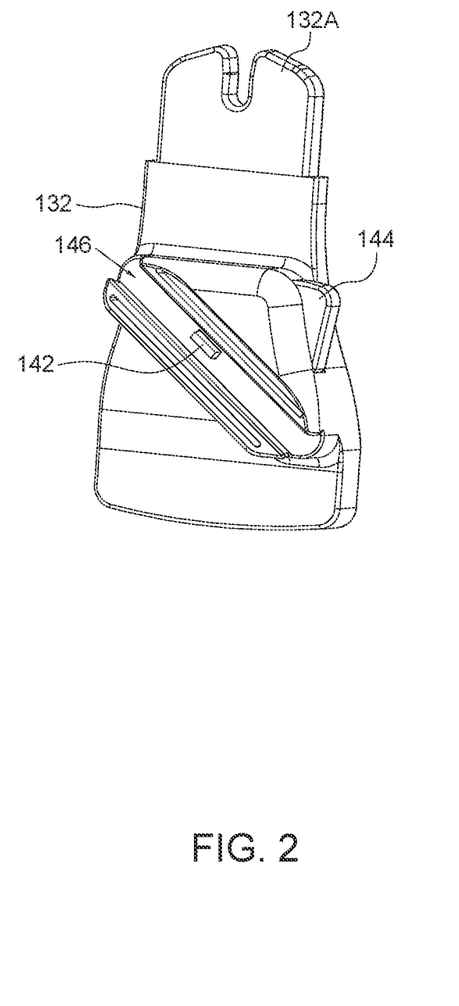
FIG. 2 is a perspective view illustrating an adapter used in the child stroller apparatus shown in FIG. 1.
Figure 3:
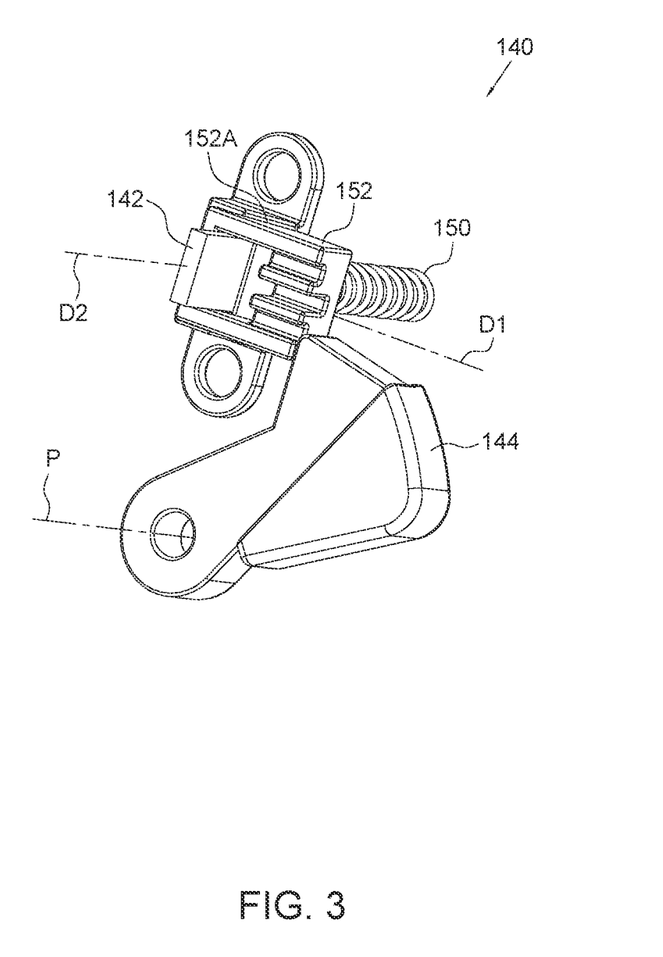
FIG. 3 is a perspective view illustrating a locking mechanism for locking the adapter of FIG. 2 in position on a side segment of a push handle frame in a child stroller apparatus.

In conjunction with FIG. 1, FIG. 2 is a perspective view illustrating the adapter 132 alone, and FIG. 3 is a perspective view illustrating a locking mechanism 140 for locking the adapter 132 in position on the side segment 108A of the push handle frame 108. Referring to FIGS. 1-3, the locking mechanism 140 can be assembled with the adapter 132, and can include a latch 142 and a release actuator 144 respectively connected with the adapter 132. The adapter 132 can have a channel 146 through which the rail 134 can be disposed, and the latch 142 is disposed inside the adapter 132 and can protrude into the channel 146. The latch 142 is movable to engage with any one of multiple openings 148 provided on the side segment 108A to prevent sliding of the adapter 132 along the side segment 108A, whereby the adapter 132 can be locked in any desirable positions along the side segment 108A. The openings 148 may be exemplary formed on the rail 134. A spring 150 may be connected with the latch 142 for biasing the latch 142 to a locking position. The release actuator 144 is exposed outward on the adapter 132 for operation, and is operatively connected with the latch 142. The release actuator 144 is operable to urge the latch 142 to disengage from the opening 148, whereby the adapter 132 can be unlocked and slide along the side segment 108A for adjustment. For example, the latch 142 can be in sliding contact with a ramp surface 152A of a linking part 152 slidably assembled inside the adapter 132, and the release actuator 144 is rotatable about a pivot axis P to push against the linking part 152, which causes the linking part 152 to slide along an axis D1 and consequently urge the latch 142 to move along an axis D2 in an unlocking direction.

Figure 4:
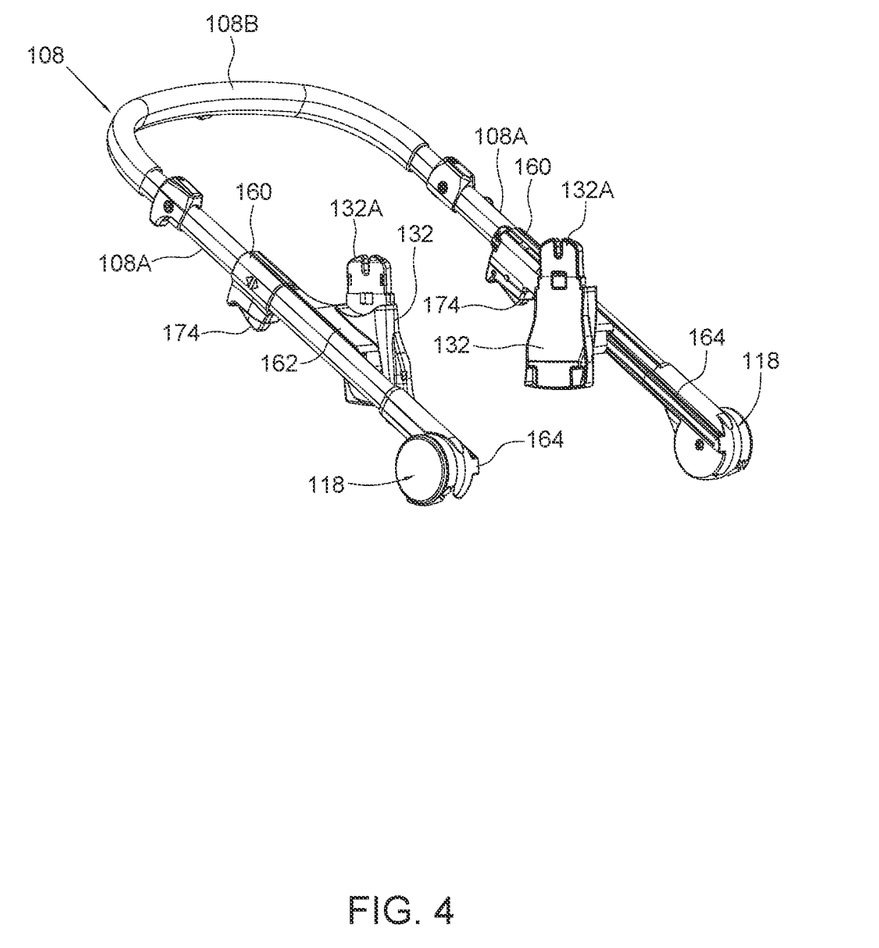
FIG. 4 is a perspective view illustrating another construction for slidably connecting an adapter with a side segment of a push handle frame in a child stroller apparatus.

FIG. 4 is a perspective view illustrating another construction that may be used for slidably connecting each adapter 132 with the corresponding side segment 108A of the push handle frame 108 in the child stroller apparatus 100. Referring to FIG. 4, the adapter 132 can be fixedly connected with a handle 160 via an extension 162. The handle 160 can have an outer shape suitable to provide comfortable and secure hand grip for adjusting the adapter 132. For example, the handle 160 can have a round shape that can at least partially wrap around the side segment 108A. The adapter 132 and the handle 160 can be disposed apart from each other along the side segment 108A, and can be fixedly connected with the extension 162 at two opposite ends of the extension 162. The extension 162 can extend generally parallel to the side segment 108A, and may be disposed at an inner side of the side segment 108A. According to an example of construction, the extension 162 can have an elongate shape extending substantially parallel to the side segment 108A, and can have a thickness that is equal to or smaller than the thickness of the side segment 108A. The extension 162 may be placed within a region between the upper and lower boundaries of the side segment 108A without protruding upward and downward from the side segment 108A.

The adapter 132, the handle 160 and the extension 162 can form a unitary block that is slidably connected with the side segment 108A. For example, the handle 160 can have a cavity through which is slidably disposed the side segment 108A, so that the handle 160, the extension 162 and the adapter 132 can slide in unison along the side segment 108A. Moreover, a rail 164 may be fixedly connected with the side segment 108A for guiding the sliding movement of the block comprised of the adapter 132, the handle 160 and the extension 162 along the side segment 108A. According to an example of construction, the rail 164 may extend across and end on the pivot connection 118. For example, the rail 164 may extend across and end on a coupling shell of the pivot connection 118. With this construction, the handle 160 can be located behind the adapter 132 for easy access and operation when the child stroller apparatus is in an unfolded state for use, and the adapter 132 may be conveniently adjusted along the side segment 108A by gripping the handle 160. For example, the adapter 132 can slide for adjustment to a lowest position where the adapter 132 is adjacent to and at the same level as the pivot connection 118, or to one or more upper position where the adapter 132 is spaced apart from and above the pivot connection 118.

Figure 5:
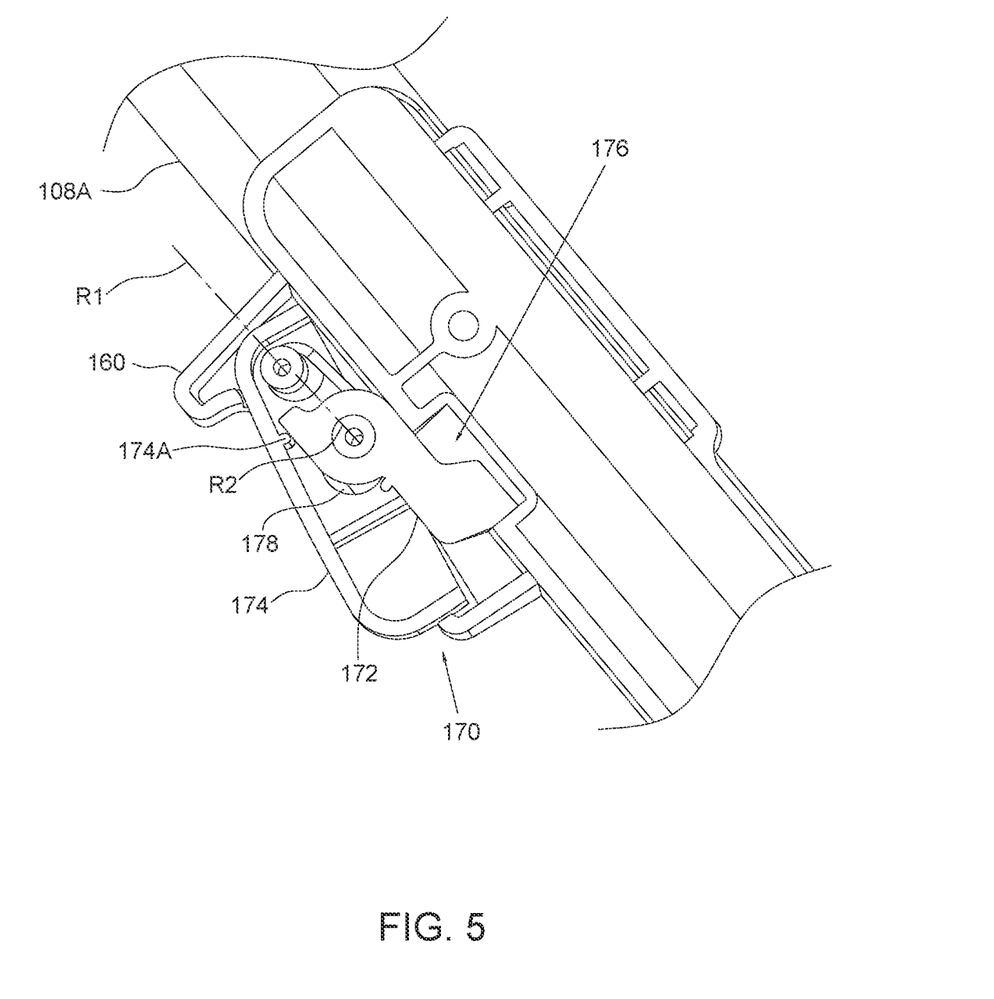
FIG. 5 is a cross-sectional view illustrating a locking mechanism for locking the adapter shown in FIG. 4 in position on the side segment of the push handle frame.

In conjunction with FIG. 4, FIG. 5 is a cross-sectional view illustrating a locking mechanism 170 for locking the adapter 132 shown in FIG. 4 in position on the side segment 108A of the push handle frame 108. Referring to FIGS. 4 and 5, the locking mechanism 170 can be assembled with the handle 160, and can include a latch 172 and a release actuator 174 respectively connected with the handle 160. For example, the latch 172 and the release actuator 174 may be respectively connected pivotally with the handle 160. The latch 172 is movable to engage with any one of multiple openings 176 provided on the side segment 108A to prevent sliding of the adapter 132 along the side segment 108A, whereby the adapter 132 can be locked in any desirable positions along the side segment 108A. A spring 178 may be connected with the latch 172 for biasing the latch 172 to the locking position. The release actuator 174 is exposed outward on the handle 160 for operation, and is operatively connected with the latch 172. The release actuator 174 is operable to urge the latch 172 to disengage from the side segment 108A, whereby the adapter 132 can be unlocked and slide along the side segment 108A for adjustment. For example, the release actuator 174 is rotatable about a pivot axis R1 relative to the handle 160 to cause a rib 174A provided on the release actuator 174 to push the latch 172 in rotation about a pivot axis R2 for disengaging the latch 172 from the side segment 108A and thereby unlock the block comprised of the handle 160, the extension 162 and the adapter 132.

According to an example of construction, the latch 172 may be configured so that upward sliding of the adapter 132 along the side segment 108A can urge the latch 172 to disengage from the opening 176 without the need of pressing the release actuator 174. For example, the latch 172 may have a ramped surface, and an edge of the opening 176 may contact and push against the ramped surface of the latch 172 to cause disengagement of the latch 172 when the adapter 132 slides upward. Accordingly, the adapter 132 is allowed to slide upward without the need of operating the release actuator 174.

Figure 6:
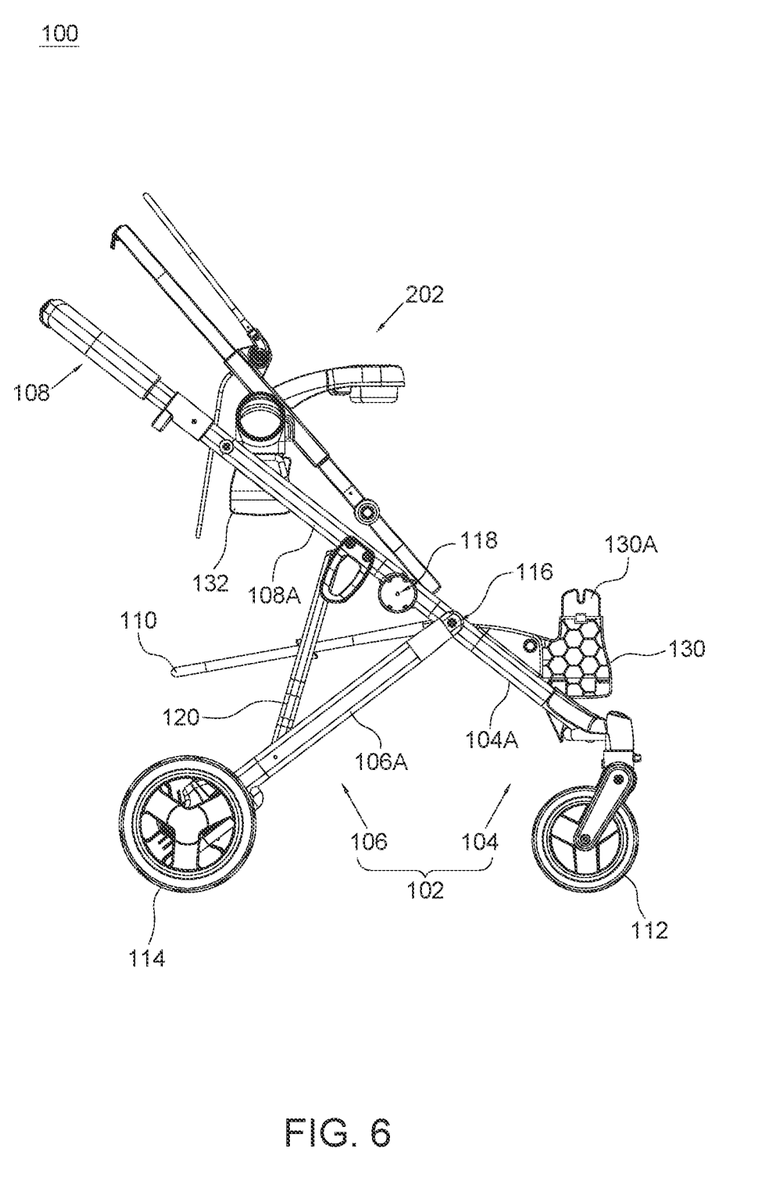
FIGS. 6-10 are side views illustrating exemplary configurations of a child stroller apparatus in an unfolded state with various detachable parts installed thereon in different positions.

FIGS. 6-10 are side views illustrating exemplary configurations of the child stroller apparatus 100 in an unfolded state with various detachable parts installed thereon in different positions. In FIG. 6, a detachable child stroller seat 202 is installed on the adapters 132 in a forward facing position, and no detachable part is installed on the adapters 130.

Figure 7:
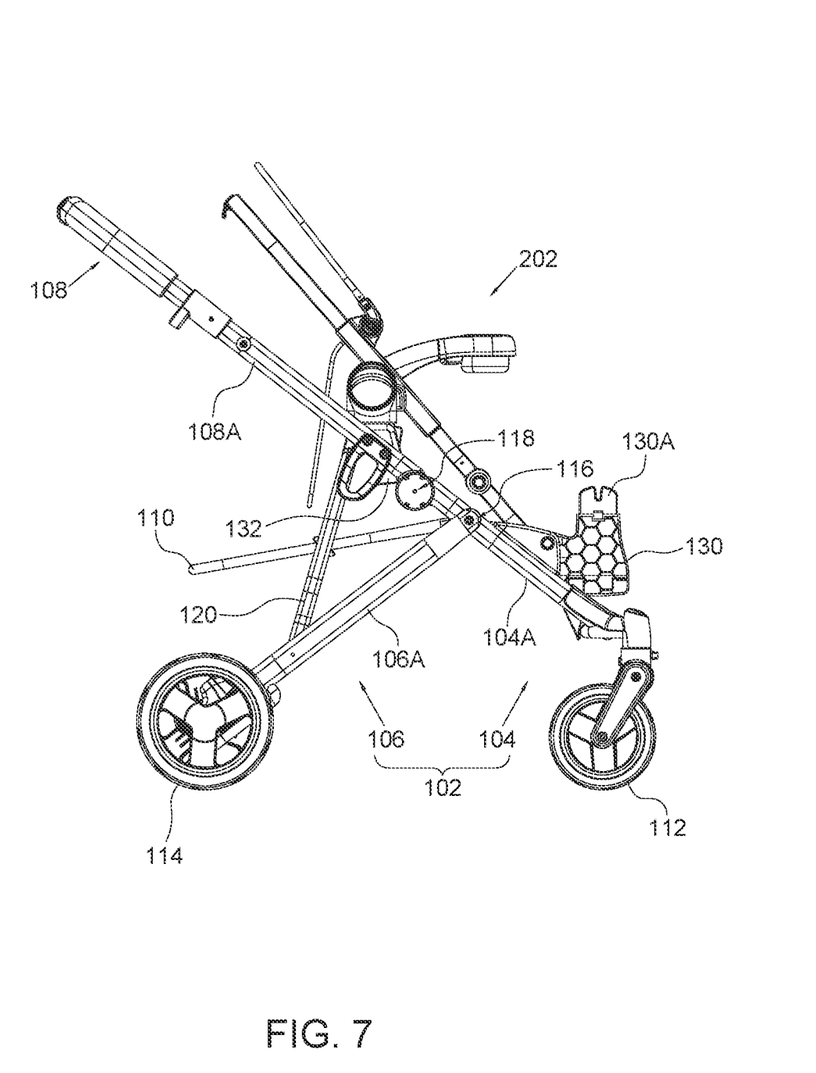

In FIG. 7, the detachable child stroller seat 202 is placed in a position lower than that shown in FIG. 6 by downwardly adjusting the adapters 132 on the side segments 108A of the push handle frame 108.

Figure 8:
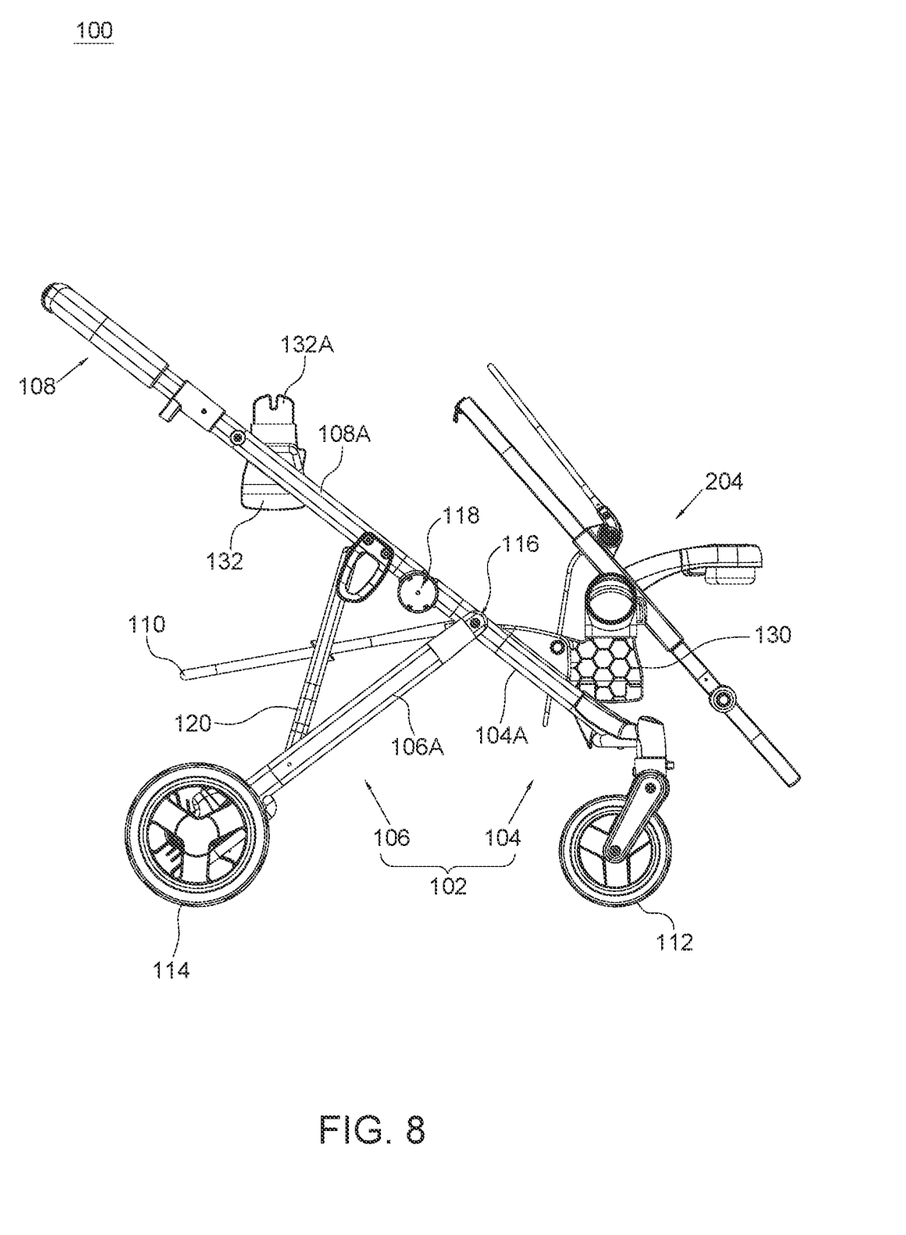

In FIG. 8, a detachable child stroller seat 204 is installed on the adapters 130 in a forward facing position, and no detachable part is installed on the adapters 132.

Figure 9:
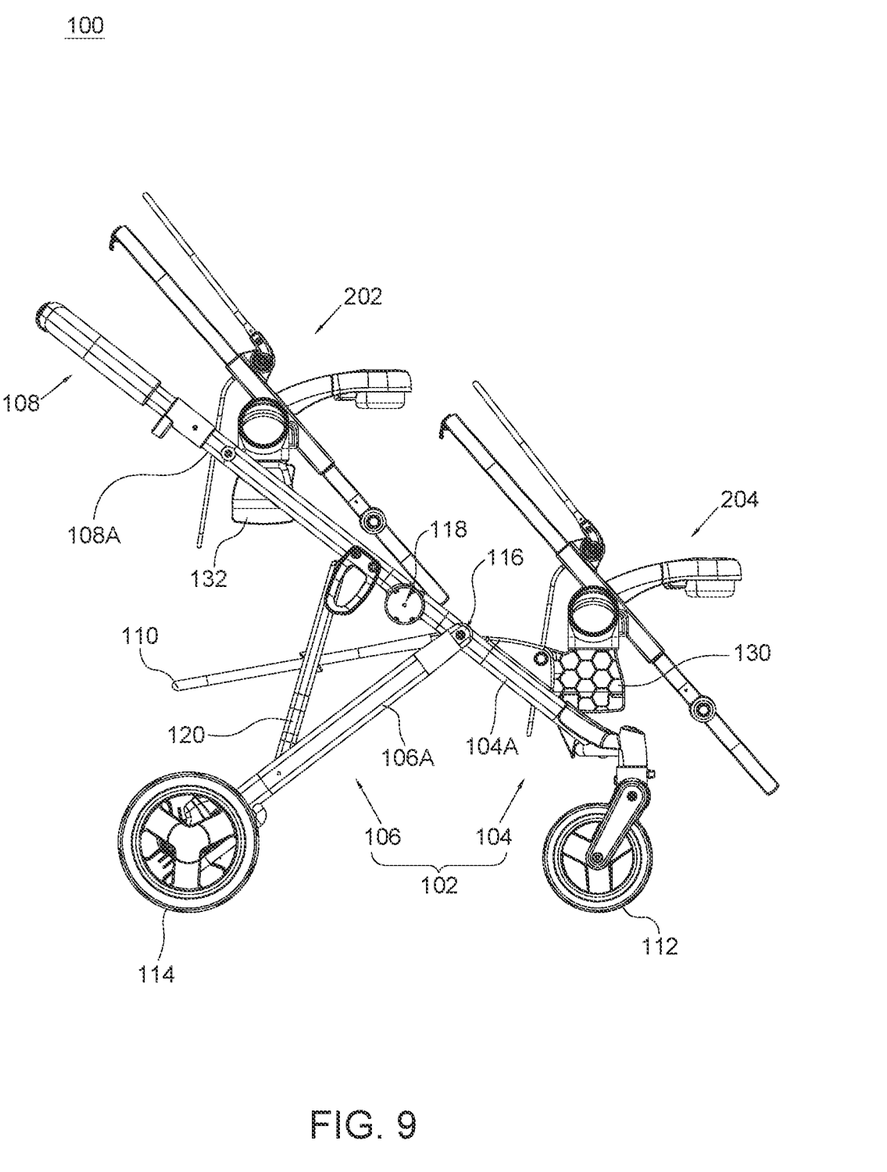

In FIG. 9, the detachable child stroller seat 202 is installed on the adapters 132 in a forward facing position, and the detachable child stroller seat 204 is installed on the adapters 130 in a forward facing position below the child stroller seat 202.

Figure 10:
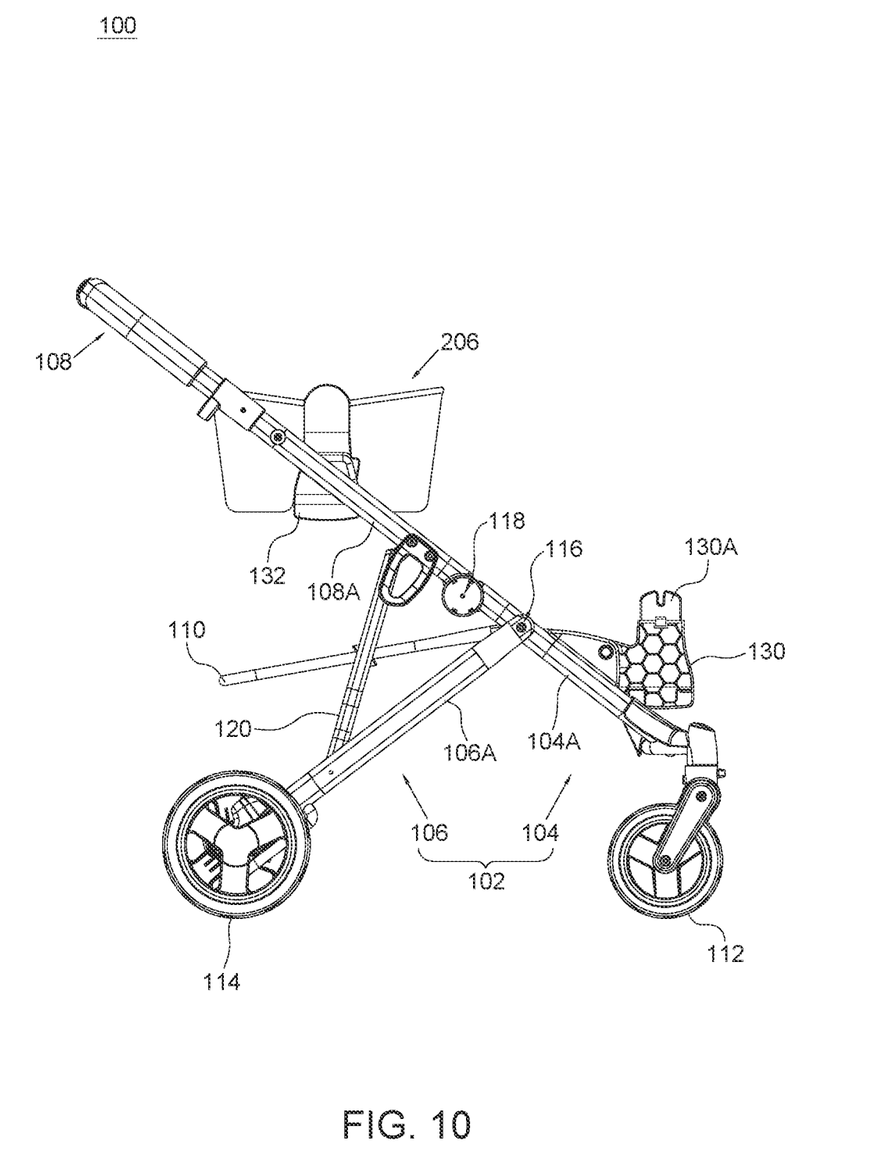

In FIG. 10, a detachable basket 206 is installed on the adapters 132, and no detachable part is installed on the adapters 130.

It will be appreciated that FIGS. 6-10 show some examples of configurations for illustration only, and other configurations of installation may be implemented with the mount system described herein. The adapters 130 and 132 of the mount system described herein can therefore allow multiple configurations for installing different types of detachable parts as desired.

Advantages of the structures described herein include the ability to provide a child stroller apparatus that is convenient to operate, and has a mount system allowing the installation of one or more detachable child seats or other types of detachable parts as desired. Accordingly, the child stroller apparatus can offer more flexibility in use.

Realization of the child stroller apparatus has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:
1. A child stroller apparatus, comprising:
 a standing frame;
 a push handle frame having a side segment, the side segment being pivotally connected with the standing frame via a pivot connection;
 an adapter having a coupling portion configured to receive an installation of a detachable part, the adapter being fixedly connected with a handle, the handle having a cavity through which is slidably disposed the side segment so that the handle and the adapter are slidable in unison along the side segment for adjustment; and
 a locking mechanism configured to lock the adapter in position on the side segment, the locking mechanism including a release actuator exposed on the handle for operation, the release actuator being operable to cause the locking mechanism to unlock for sliding adjustment of the handle and the adapter along the side segment.
2. The child stroller apparatus according to claim 1, wherein the handle is located behind the adapter when the child stroller apparatus is in an unfolded state for use.

3. The child stroller apparatus according to claim 1, wherein the handle at least partially wraps around the side segment.

4. The child stroller apparatus according to claim 1, wherein the adapter and the handle are disposed apart from each other along the side segment and are fixedly connected with each other via an extension.

5. The child stroller apparatus according to claim 4, wherein the adapter and the handle are fixedly connected with the extension at two opposite ends of the extension.

6. The child stroller apparatus according to claim 4, wherein the extension is disposed at an inner side of the side segment.

7. The child stroller apparatus according to claim 1, wherein the handle has a round shape that at least partially wraps around the side segment, and the adapter is placed at an inner side of the side segment.

8. The child stroller apparatus according to claim 1, wherein the locking mechanism is assembled with the handle.

9. The child stroller apparatus according to claim 1, wherein the locking mechanism includes a latch connected with the handle, the latch being movable to engage with the side segment to prevent sliding of the adapter along the side segment, and the release actuator being operable to urge the latch to disengage from the side segment.

10. The child stroller apparatus according to claim 9, wherein the latch is configured so that upward sliding of the adapter along the side segment urges the latch to disengage from the side segment.

11. The child stroller apparatus according to claim 9, wherein the locking mechanism further includes a spring configured to bias the latch to a locking position engaged with the side segment.

12. The child stroller apparatus according to claim 1, wherein the adapter is slidable to a position where the adapter is adjacent to and at a same level as the pivot connection.

13. The child stroller apparatus according to claim 1, wherein the coupling portion of the adapter is configured to receive the installation of a detachable child seat or a basket as the detachable part.

14. The child stroller apparatus according to claim 1, wherein the standing frame includes a front leg frame having a second side segment, and a rear leg frame having a third side segment pivotally connected with the second side segment, the side segment of the push handle frame being pivotally connected with the second side segment of the front leg frame via the pivot connection.

15. The child stroller apparatus according to claim 14, further comprising:
a second adapter provided on the second side segment configured to receive the installation of a detachable part.

16. The child stroller apparatus according to claim 15, wherein the second adapter is pivotally connected with the second side segment.

\* \* \* \* \*